United States Patent [19]

Stuber et al.

[11] Patent Number: 4,927,047
[45] Date of Patent: May 22, 1990

[54] INSULATED JACKET FOR BEVERAGE CONTAINER

[75] Inventors: Michael G. Stuber, Shakopee; Charles E. Effertz, Wayzata, both of Minn.

[73] Assignee: Cantainer Corporation, Eden Prairie, Minn.

[21] Appl. No.: 388,066

[22] Filed: Jul. 31, 1989

[51] Int. Cl.$^5$ ............................................. A47G 19/00
[52] U.S. Cl. ................................... 220/90.2; 220/263; 220/903; 215/235; 215/12.1; 206/805
[58] Field of Search ............................. 220/85–90.2, 220/90.4, 335, 337, 263, 262, 264, 903; 215/235, 12.1, 100 R; 206/805

[56] References Cited

U.S. PATENT DOCUMENTS

| | | |
|---|---|---|
| 175,124 | 3/1876 | Luthy. |
| 214,169 | 4/1879 | Merrill. |
| 425,352 | 4/1890 | Streeter ............................. 215/235 |
| 1,430,308 | 9/1922 | Hill. |
| 2,251,551 | 8/1941 | O'Reilly. |
| 2,896,812 | 7/1959 | Paprocki ............................. 220/85 H |
| 3,023,922 | 3/1962 | Arrirston ............................. 220/903 |
| 3,092,277 | 6/1973 | Brim. |
| 3,120,879 | 2/1964 | Warner. |
| 3,905,511 | 9/1975 | Groendal. |
| 4,127,211 | 11/1978 | Zerbey ............................. 220/85 H |
| 4,194,627 | 3/1980 | Christensen ......................... 220/903 |
| 4,354,611 | 10/1982 | Propst. |
| 4,519,520 | 5/1985 | Hill ............................. 220/263 |
| 4,735,333 | 4/1988 | Lay ............................. 220/85 H |

FOREIGN PATENT DOCUMENTS

| | | | |
|---|---|---|---|
| 1255528 | 11/1967 | Fed. Rep. of Germany ...... | 215/235 |
| 405640 | 7/1966 | Switzerland ........................ | 220/263 |

Primary Examiner—George E. Lowrance
Attorney, Agent, or Firm—Schroeder & Siegfried

[57] ABSTRACT

An inexpensive reusable insulated jacket for removably receiving an open beverage can therewith, and to maintain its contents in refrigerated condition, having a cover for preventing windblown sand and other foreign materials from entering the can and thereby contaminating its contents. The jacket is designed so that it is comprised of only two separate molded pieces of insulating material, a cylindrical cup-like member and a cover, the cover being secured to the cup-like member solely by a small elastic band anchored upon the cup-like member and extending over the cover while urging same toward closed protecting position.

A bearing surface is molded into the cover and cooperates with a bearing surface molded into the cup-like member, so as to obviate the need for a fixed hinge member, the latter being difficult to secure and maintain in molded insulating material and relatively expensive to manufacture. The elastic band and its anchor are positioned so that the band will hold the cooperating bearing surfaces in registering relation as the cover moves between its open and closed positions.

21 Claims, 1 Drawing Sheet

INSULATED JACKET FOR BEVERAGE CONTAINER

BACKGROUND OF THE INVENTION

I have found that there is a definite need for an insulating jacket for open cans of soft drinks, beer, etc; particularly on the beaches, which will protect the contents of the open can from being contaminated by the wind blowing sand or other foreign materials into the opening of the can. Insulating jackets for such cans have been known heretofore, but none provide a means for precluding the type of contamination described above.

One of the difficulties I have found with providing a sufficiently inexpensive insulating jacket is that the jacket, when manufactured of conventional insulating materials, will not adequately support the hinge structure needed for securing a cover member to a cup-like member. If the contents of an open beverage can, such as is described above, are to be adequately protected, some means for covering the opening of the can must be provided. If that means is to be in form of a cover for the jacket, hinge means must be provided so that the cover will not become lost and can be readily and easily opened and securing in closed position. But it is difficult, if not immpossible, to connect conventional hinge means to a jacket and cover securely, without substantially weakening the portions of the jacket and cover to which it is attached. Conventional hinge means soon break free from the insulated material, with an end result that replacement costs are prohibitive.

The closest prior art known to me is U.S. Pat. No. 3,905,511 which shows an insulated jacket for such a can. This patent, however, is not directed toward solving the above problems. Its primary purpose is to maintain the contents of the can in refrigerated condition and to permit the user to drink from the open can without lifting the cover. Thus, the cover member is perforated, having a goodly-sized opening 11 therein, so as to enable the user to drink from the can without lifting the cover. Such a structure, of course, will not preclude the entrance of sand, etc. when the wind blows, and thus is totally inadequate for the purposes and needs outlined herein. It will be noted that it advocates the use of an acetate strip bonded to the cover and cup to function as a hinge member for the cover. Such strips are found to be inadequate, however, in that they soon become detached through use and/or the effect of the wind, from one or both surfaces to which they are adhered. If the jacket were to be made with a cover which must be lifted each time the user desires to partake of the contents of the can, the acetate strip will be short-lived and therefore inadequate.

BRIEF SUMMARY OF THE INVENTION

I have found that the above inadequacies may be overcome by properly designing the jacket in the form of two uniquely shaped elements. I have eliminated the need for a separate mechanical hinge element which positively interconnects the cup and cover members, as hereinbefore suggested, and is impossible to secure without undue and undesirable weakening of the main body and the cover member.

I have designed the main body or cup member so as to incorporate into its exterior surface a bearing surface tached facing and complementary bearing surface designed into the cover member. In this way, if retaining means is provided for holding such two bearing surfaces in registering relation, the need for the mechanical hinge is obviated and neither of the two members are unduly weakened.

I have provided such retaining means through the use of a simple and inexpensive tension means, namely, an annular rubber band. I provide a pair of anchor pins on the cup and thereby anchor opposite ends of such a rubber band upon the main body member, while stretching the same over the top of the cover member. Proper positioning of the anchor means brings the rubber band across the top of the cover member in proper position so as to urge the cover toward closed position at all times until the location of the stretched bands moves beyond over-dead-center position, after which the two strands of the band hold the cover in erect open position as it bears against an abutment designed into the cup member for that purpose.

The above device is simple, very inexpensive to mold, practical, reusable, highly serviceable, and replaceable at low cost. Most importantly, it protects the contents of the open can from contamination while effectively insulating same, despite relatively high winds, etc.

BRIEF DESCRIPTION OF THE DRAWINGS

A detailed description of one preferred embodiment of the INSULATED JACKET FOR BEVERAGE CONTAINER is hereafter described with specific reference being made to the drawings in which.

DETAILED DESCRIPTION OF THE INVENTION

Figure 1:
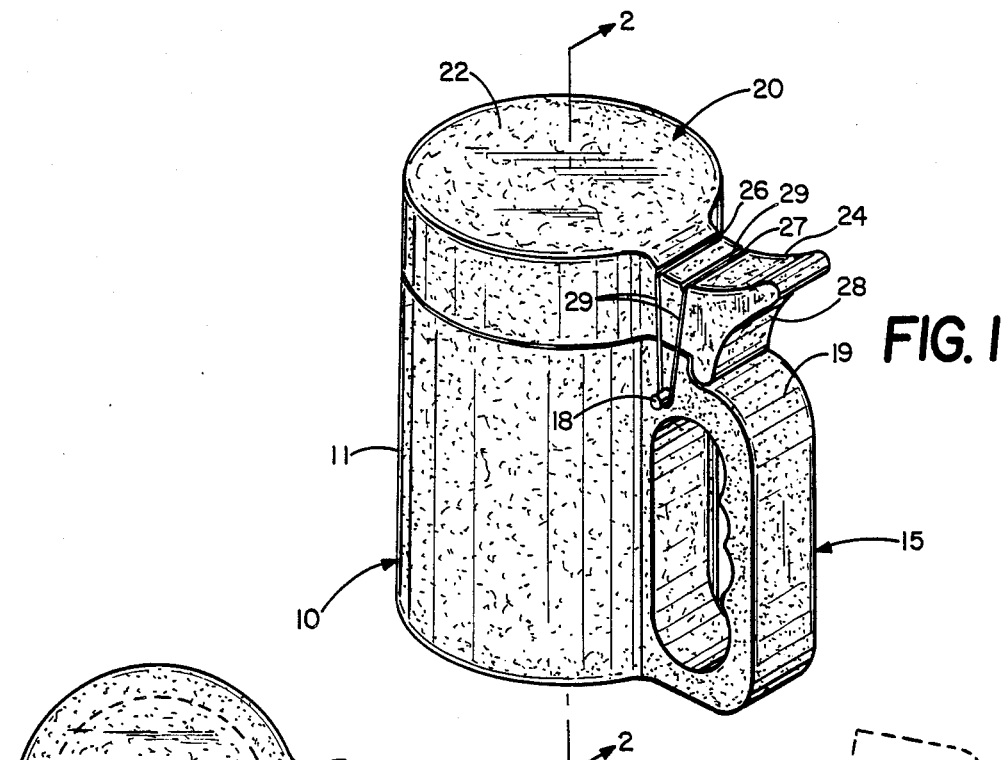
FIG. 1 is a perspective view of one of my insulated jackets, the view from the opposite side being substantially a mirror image thereof.
Figure 3:
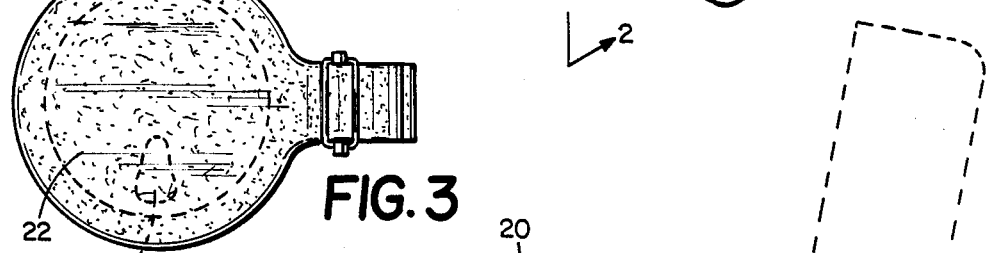
FIG. 3 is a top plan view thereof, with the open beverage can being shown in broken lines.

The preferred embodiment of my invention, as shown in FIG. 1, includes a generally cylindrical upright body member 10 made of a molded thermal-insulating material such as expanded polystyrene in the form of a thermal-insulating jacket 11 for a beverage container 12, such as an open can of beer. As shown, the jacket has a closed bottom 13 and an open top, the latter being defined by a generally cylindrical central opening 14 which extends generally axially of the body member 10 and accomodates the beverage container, as shown. The opening 14 is of a size only slightly larger than the conventional beverage can and thus readily receives such a container in close shape-conforming relation. Opening 14 increases only slightly from bottom to top to facilate reception and removal of the can 12.

The body member 10 also includes handle structure 15 which adapts the same for ready use while the contents of the container are being consumed. An exterior bearing surface 16 is carried by the handle 15 near the top of the opening 14. Slightly below the bearing surface 16 there is a transverse bore 17 extending through the handle structure and accomodating a wooden or plastic anchor pin 18 therein. Anchor pin 18, it will be noted, is located slightly forwardly and below bearing surface 16. Just rearwardly of the anchor pin 18 and bearing surface 16, the handle has an exterior abutment surface 19. The entire body member 10, which includes the jacket 11 and handle structure 15, is molded integrally of the same material.

Disposed immediately above the opening 14 and closing off same is an imperforate molded cover member 20 which is separately molded of the same material as body member 10 and has a cylindrical recess 21 in its underside immediately above the opening 14 and of substantially the same size so as to accommodate the upper portions of the beverage container 12 when it is disposed as shown within the jacket 11. As shown, the cover 20 has an upperside 22 and an underside 23.

Figure 2:
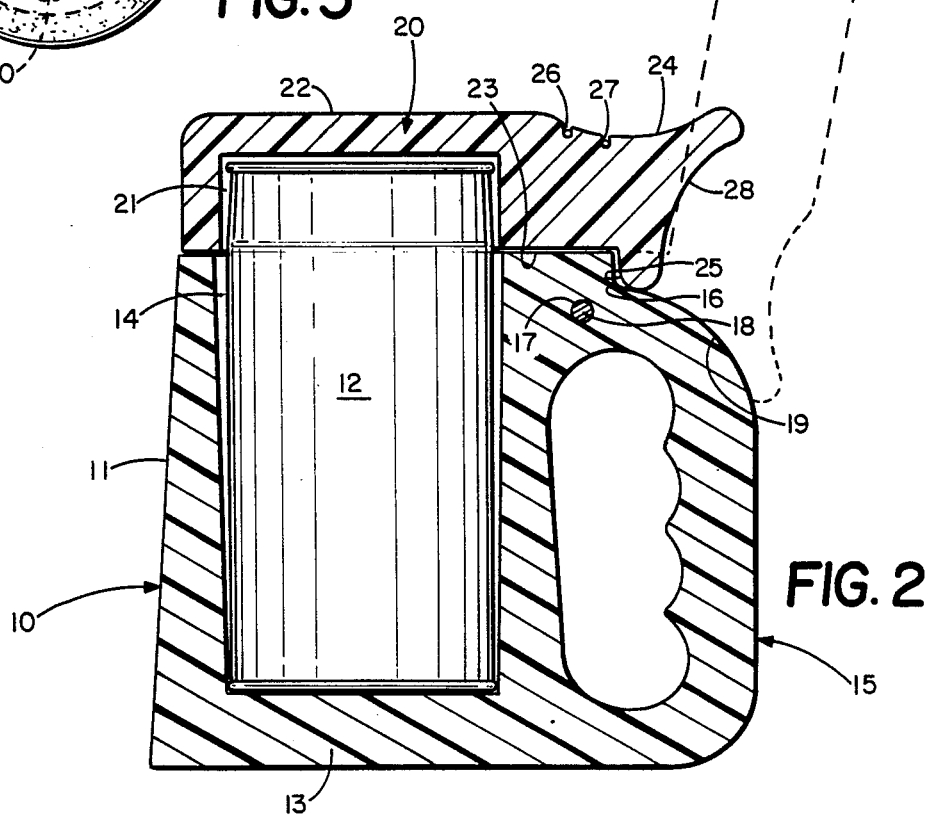
FIG. 2 is a vertical sectional view thereof taken along line 2—2, of FIG. 1.

Cover member 20, as best shown in FIG. 1, includes a thumb lever element 24 which extends rearwardly therefrom and over handle structure 15. This lever element is characterized by a convex bearing surface 25 which depends from the underside of cover member 20 and faces toward opening 14 and bears against and cooperates with bearing surface 16 of the jacket to provide a pivot for cover member 20, as best shown in FIG. 2. It also has a pair of spaced parallel, transverse channels or grooves 26, 27 formed in its upper surface for purposes to be hereinafter described. Channel 26 is located slightly ahead of anchor pin 18 and channel 27 is slightly therebehind. An abutting surface 28 extends vertically at the rear end of the lever element and is disposed just below the area where the user's thumb engages thumb lever 24.

An elastic band 29 extends around one outwardly extending end of the anchor pin 18, as best shown in FIG. 1, and is thereby anchored to the handle structure 15. From the pin 18, this band is extended upwardly and across the top-side of the cover member 20, the opposite segments of the band extending within grooves 26 and 27, as shown. The opposite end of the band is anchored on the side opposite that shown in FIG. 1, by extending around the opposite outwardly extending end of anchor pin 18. As shown, the band 29 is of such a length that it is necessarily stretched and under tension when so disposed. As a consequence it constantly urges cover member 20 toward closed position.

It will be seen by reference to FIG. 2 that convex bearing surface 25 of cover member 20 bears against concave bearing surface 16 of the jacket to provide a pivot for the cover member as it moves between open and closed positions. The band 29 maintains these two bearing surfaces 16, 25 in engaging relation at all times. Since groove 26 is located ahead of pin 18, cover member 20 is urged toward closed position at all times except when it is moved to an open over-dead-center position, such as shown in broken lines in FIG. 2.

As shown in FIG. 2, when cover member 20 is moved to open position by the user applying downward pressure upon lever member 24, elastic band 29 holds cover member in that position. Concave abutting surface 28 of cover member 20 engages convex abutment surface 19 when the cover member is moved to that position, as is shown. As shown abutting surface 28 and abutment surface 19 complement each other, since they have the same radius. Cover member 20 will be maintained in that erect open position by elastic band 29 until such time as it is swung forwardly past over-dead-center position, at which time elastic band 29 will cause cover member 20 to snap shut into closed position as shown in FIG. 1 and 2. While in such closed position, cover member 20 will positively preclude any windblown sand or other foreign materials from being blown into the opening 30 of can 12, thereby enabling the user to enjoy the beverage contents of the can over an extended period of time without contamination of the beverage.

A big advantage of my insulated jacket 10 is that it can be manufactured, and consequently sold, so inexpensively, while at the same time effectively protecting the contents of an open can of beverage from windblown sand, etc. As a consequence of using a rubber band and bearing surfaces 16 and 25, as shown and described, it is possible to obviate the need for positively affixing a mechanical hinge member to each of the cover 20 and cup-like member 11. Since such hinge members readily tear loose from foamed insulating material such as expanded polystrene one of my insulated jackets will far outlast any similar insulating jacket having such a positively affixed hinge. Moreover, the latter is much more expensive to manufacture. Also, either the cover member 20 or the cup-like member 11 of my design can be readily and inexpensively replaced by the user in the event of inadvertent physical damage thereto.

It will be readily seen that assembly costs of my above insulating jacket are at an absolute minimum. The cover is merely positioned in closing position, pin 18 is inserted, and a simple rubber band 29 is applied as shown. Thus a minimum of time, labor, and expense is involved, particularly in view of the fact that every element is very inexpensive.

In considering this invention, it should be remembered that the present disclosure is illustrative only and the scope of the invention should be determined by the appended claims.

What is claimed is:

1. A reusable insulated jacket constructed and arranged for removably receiving an open cylindrical beverage container therewithin and for preventing windblown sand and other foreign materials from entering the opening of the container, said jacket comprising:
   (a) an upright main body member of molded thermal-insulating material having a substantially cylindrical open interior and a closed bottom and a cylindrical opening at its upper end which will receive an open cylindrical beverage container therein in close-fitting shape-conforming thermal-insulating relation;
   (b) said body member having an exterior bearing surface;
   (c) a separate imperforate molded cover member of thermal-insulating material extending across said upper end of said main body member and sealing off said cylindrical opening, said cover member having an underside;
   (d) said cover member having a cooperative bearing surface at said underside engaging said bearing surface of said body and pivoting thereagainst while moving between open and closed positions of said cover member relative to the interior of said main body member, thereby providing a pivot function for said cover member during such movement; and
   (e) resilient tension means extending between said cover member and said body member and maintaining said bearing surfaces in interengaging relation and urging said cover member toward said closed position.

2. The structure defined in claim 1, wherein said cover member is devoid of permanent attachment to said container.

3. The structure defined in claim 1, wherein said bearing surface on said cover member depends from said underside of said cover member.

4. The structure defined in claim 1, wherein said bearing surface of said cover member is convex.

5. The structure defined in claim 1, wherein said bearing surface of said cover member faces toward said open interior of said body member.

6. The structure defined in claim 1, wherein said cover member is only temporarily attached to said body member.

7. The structure defined in claim 1, wherein said cover member is unattached with respect to said tensioning means.

8. The structure defined in claim 1, wherein said cover member has an upper side, and said tension means extends across said upper side and is anchored upon said body member.

9. The structure defined in claim 1, wherein said tension means is anchored upon one of said members.

10. A reusable insulated jacket constructed and arranged for removably receiving an open cylindrical beverage container therewithin and for preventing windblown sand and other foreign materials from entering the opening of the container, said jacket comprising:
(a) an upright main body member of molded thermal-insulating material having a substantially cylindrical open interior and a cylindrical opening at its upper end which will receive an open cylindrical beverage container therein in close-fitting, surrounding, shape-conforming, thermal-insulating relation;
(b) said body member having an exterior bearing surface;
(c) a separate imperforate molded cover member of thermal-insulating material extending across said upper end of said main body member and sealing off said cylindrical opening;
(d) said cover member having a cooperative bearing surface engaging said bearing surface of said body and pivoting thereagainst while moving between open and closed positions of said cover member relative to the interior of said main body member and thereby providing a pivot for said cover member between said open and closed positions; and
(e) resilient tension means extending between said cover member and said body member and temporarily and impositively engaging said cover member while maintaining said bearing surfaces in engaging relation and urging said cover member toward said closed position.

11. The structure defined in claim 10 wherein said cover member has an upper side and said tension means includes an elastic band extending across said upper side of said cover member.

12. The structure defined in claim 10 wherein said cover member is completely detached from said body member except for said resilient tensioning means.

13. The structure defined in claim 10 wherein said cover member has an upper side and has at least one transverse channel formed in said upper side and at least a portion of said tension means extends within said channel.

14. The structure defined in claim 10, wherein said body member includes handle structure and said bearing surface of said body member is disposed upon said handle structure.

15. The structure defined in claim 10 wherein said tension means is anchored upon said body member in a plane located between said bearing surface and said open interior of said body member.

16. The structure defined in claim 10 wherein said tension means is connected to said body member adjacent said bearing surface of said body member and extends over said cover member in a plane located between said bearing surface and said open interior of said body member.

17. The structure defined in claim 10, wherein said body member includes handle structure which carries said bearing surface of said body member and also carries an abutment surface against which said cover member is supported when said cover member is moved to a fully open position, said abutment surface being disposed adjacent to and outwardly of said bearing surface of said body member.

18. A reusable insulated jacket constructed and arranged for removably receiving an open cylindrical beverage container therewithin and for preventing windblown sand and other foreign materials from entering the opening of the container, said jacket comprising:
(a) an upright main body member of molded thermal-insulating material having a substantially cylindrical open interior and a closed bottom and a cylindrical opening at its upper end which will receive an open cylindrical beverage container therein in close-fitting, surrounding, shape-conforming, thermal-insulating relation;
(b) said body member having an exterior bearing surface;
(c) a separate imperforate molded cover member of thermal-insulating material extending across said upper end of said main body member and sealing off said cylindrical opening;
(d) said cover member having a cooperative bearing surface engaging said bearing surface of said body and pivoting thereagainst while moving between open and closed positions of said cover member relative to the interior of said main body member and thereby providing a pivot function for said cover member; and
(e) readily releasable resilient tension means anchored upon said main body member and engaging said cover member exteriorly only, while maintaining said bearing surfaces in engaging relation and urging said cover member toward said closed position.

19. The structure defined in claim 18, wherein said cover member only temporarily engages to said body member.

20. The structure defined in claim 18, wherein said tension means engages but is otherwise disconnected relative to said cover member.

21. The structure defined in claim 18, wherein said tension means extends over said cover member but is otherwise disconnected therefrom.

* * * * *